US011046289B2

(12) United States Patent
Michels et al.

(10) Patent No.: US 11,046,289 B2
(45) Date of Patent: Jun. 29, 2021

(54) SYSTEM COMPRISING SEPARATE CONTROL UNITS FOR THE ACTUATION UNITS OF AN ELECTRIC PARKING BRAKE

(71) Applicant: Lucas Automotive GmbH, Koblenz (DE)

(72) Inventors: Erwin Michels, Kail (DE); Benedikt Ohlig, Vallendar (DE); Matthias Fuchs, Koblenz (DE)

(73) Assignee: ZF Active Safety GmbH, Koblenz (DE)

( * ) Notice: Subject to any disclaimer, the term of this patent is extended or adjusted under 35 U.S.C. 154(b) by 236 days.

(21) Appl. No.: 16/343,016

(22) PCT Filed: Oct. 10, 2017

(86) PCT No.: PCT/EP2017/075728
§ 371 (c)(1),
(2) Date: Apr. 18, 2019

(87) PCT Pub. No.: WO2018/073038
PCT Pub. Date: Apr. 26, 2018

(65) Prior Publication Data

US 2020/0070788 A1 Mar. 5, 2020

(30) Foreign Application Priority Data

Oct. 20, 2016 (DE) ......................... 102016012530.6

(51) Int. Cl.
*B60T 7/08* (2006.01)
*B60T 13/66* (2006.01)
(Continued)

(52) U.S. Cl.
CPC ............ *B60T 7/085* (2013.01); *B60T 13/662* (2013.01); *B60T 13/745* (2013.01);
(Continued)

(58) Field of Classification Search
CPC ...... B60T 7/085; B60T 13/662; B60T 13/745; B60T 2270/82; F16D 65/18; F16D 2121/14; F16D 2121/24
(Continued)

(56) References Cited

U.S. PATENT DOCUMENTS 5,961,190 A 10/1999 Brandmeier et al.
6,256,570 B1 7/2001 Weiberle et al.
(Continued)

FOREIGN PATENT DOCUMENTS

DE 19732168 C1 1/1999
DE 19826132 A1 12/1999
(Continued)

OTHER PUBLICATIONS

German Search Report, Application No. 102016012530.6, dated May 30, 2017.
(Continued)

*Primary Examiner* — Gertrude Arthur Jeanglaude
(74) *Attorney, Agent, or Firm* — Robert James Harwood

(57) ABSTRACT

A motor vehicle system comprising a first electric parking brake actuation unit assigned to a first vehicle wheel, and a second electric parking brake actuation unit assigned to a second vehicle wheel. The system further comprises a first control unit which includes at least one first microprocessor and which is designed to control the first electric parking brake actuation unit and does not allow the second electric parking brake actuation unit to be controlled. Furthermore, a second control unit is provided which comprises at least one second microprocessor and which is designed to control the second electric parking brake actuation unit and does not allow the first electric parking brake actuation unit to be controlled. The redundancy of the two control units increases the system safety. At the same time, the system
(Continued)

µP-x

SP-x

ECU-x, x=1, 2, 3 complexity remains low since no individual control unit has to be designed to control all of the electric parking brake actuation units.

21 Claims, 5 Drawing Sheets

(51) Int. Cl.
*F16D 65/18* (2006.01)
*B60T 13/74* (2006.01)
*F16D 121/14* (2012.01)
*F16D 121/24* (2012.01)

(52) U.S. Cl.
CPC ........... *B60T 2270/82* (2013.01); *F16D 65/18* (2013.01); *F16D 2121/14* (2013.01); *F16D 2121/24* (2013.01)

(58) Field of Classification Search
USPC ............................................................ 701/70
See application file for complete search history.

(56) References Cited

U.S. PATENT DOCUMENTS

| | | | | |
|---|---|---|---|---|
| 6,317,675 | B1 | 11/2001 | Stölzl et al. | |
| 6,345,255 | B1 | 2/2002 | Mermelstein | |
| 6,394,235 | B1 | 5/2002 | Poertzgen et al. | |
| 6,591,705 | B1 * | 7/2003 | Reik | B60W 10/11 74/343 |
| 8,007,055 | B2 | 8/2011 | Leiter | |
| 9,302,656 | B2 | 4/2016 | Köth et al. | |
| 9,428,159 | B2 | 8/2016 | Heise et al. | |
| 9,873,414 | B2 | 1/2018 | Förster et al. | |
| 10,293,799 | B2 * | 5/2019 | Beauvais | B60T 8/96 |
| 2009/0195058 | A1 | 8/2009 | Jackson et al. | |
| 2010/0299035 | A1 | 11/2010 | Maron et al. | |
| 2016/0001781 | A1 * | 1/2016 | Fung | G16H 50/20 701/36 |

FOREIGN PATENT DOCUMENTS

| | | | |
|---|---|---|---|
| DE | 102011084534 | A1 | 4/2012 |
| DE | 102012010562 | A1 | 11/2013 |
| EP | 0780276 | A2 | 6/1997 |
| WO | 9926818 | A1 | 6/1999 |
| WO | 2006061238 | A1 | 6/2006 |
| WO | 2009013193 | A1 | 1/2009 |
| WO | 2009074252 | A1 | 6/2009 |

OTHER PUBLICATIONS

PCT International Search Report and Written Opinion, Application No. PCT/EP2017/075728, dated Jan. 18, 2018.

PCT International Preliminary Report, Application No. PCT/EP2017/075728, dated Oct. 30, 2018.

* cited by examiner

BAT-1
BAT-2
SYS-3
ECU-3
BUS-1
BUS-2
ECU-2
SYS-2
ECU-1
SYS-1
VL
HL
HR
VR
M
F
10
11
13
17
20
21
25
30
31
35
40
41
43
47
50
60
70
80
90

SYSTEM COMPRISING SEPARATE CONTROL UNITS FOR THE ACTUATION UNITS OF AN ELECTRIC PARKING BRAKE

CROSS-REFERENCE TO RELATED APPLICATIONS

This application is a national stage of International Application No. PCT/EP2017/075728, filed 10 Oct. 2017, the disclosures of which are incorporated herein by reference in entirety, and which claimed priority to German Patent Application No. 10 2016 012 530.6, filed 20 Oct. 2016, the disclosures of which are incorporated herein by reference in entirety.

BACKGROUND TO THE INVENTION

The present invention relates generally to the field of control units to be installed in a vehicle. Specifically, the control of an electric parking brake is described.

Electric parking brakes (EPB) have been adopted in a multitude of modern motor vehicles. Such EPB systems typically comprise two electric actuation units on different vehicle wheels and an EPB control unit associated with the actuation units.

In a hydraulic brake system, the EPB actuation units are installed on the wheel brakes of two opposing vehicle wheels and facilitate electric actuation of a respective wheel brake cylinder in parking brake operation (details of this can be found, for example, in DE 197 32 168 A). In normal braking operation, on the other hand, the wheel brake cylinders are actuated hydraulically. The wheel brake cylinders are connected fluidically to a main cylinder for this purpose.

In a conventional hydraulic brake system, the main cylinder is coupled mechanically to a brake pedal. In a so-called brake-by-wire system, on the other hand, the brake pedal is mechanically decoupled from the main cylinder, at least in normal braking operation. The brake pedal actuation is detected here by sensor and electronically processed to control an electric actuation unit acting on the main cylinder. Furthermore, electric brake boosters (also called Electric Brake Boost, EBB) are known, in which a force introduced by means of the brake pedal onto the main cylinder is boosted by an electric actuation unit likewise acting on the main cylinder.

On account of the cost pressure in the automotive industry, it is desirable to reduce the system costs through economies. At the same time, system safety must not suffer due to the pertinent economies. These stipulations apply in particular also to the brake system installed in the vehicle.

In this context the control of EPB actuation units by means of the control unit associated with an automatic transmission is proposed in WO 2006/061238 A1, for example. Traditional transmission locking in the form of a parking lock can be saved on in this way. WO 2006/061238 A1 also includes different approaches to redundant design of the communications connections in an EPB system, in order to increase system safety.

SUMMARY OF THE INVENTION

A feature of the present disclosure is to specify an improved system of control units in the context of an EPB.

According to a first aspect, a system for a motor vehicle is specified, which system comprises a first electric parking brake actuation unit, which is associated with a first vehicle wheel, and a second electric parking brake actuation unit, which is associated with a second vehicle wheel. The system further comprises a first control unit with at least a first microprocessor, wherein the first control unit is configured for controlling the first electric parking brake actuation unit and does not permit control of the second electric parking brake actuation unit. The system also comprises a second control unit with at least a second microprocessor, wherein the second control unit is configured for controlling the second electric parking brake actuation unit and does not permit control of the first electric parking brake actuation unit.

According to another aspect, a system for a motor vehicle is specified, which system comprises a first electric parking brake actuation unit, which is associated with a first vehicle wheel, and a second electric parking brake actuation unit, which is associated with a second vehicle wheel. The system further comprises a first control unit with at least a first microprocessor, wherein the first control unit is configured for controlling at least the first electric parking brake actuation unit as well as an anti-blocking and/or electronic stability control system. The system also comprises a second control unit with at least a second microprocessor, wherein the second control unit is configured for controlling at least the second electric parking brake actuation unit as well as an electric brake power generator and/or an automatic transmission.

The electric parking brake actuation units can be based on an electromechanical principle. In other variants the electric parking brake actuation units can be operated electrohydraulically or electropneumatically.

The motor vehicle system according to the first or the second aspect can further comprise a control line system, which connects the first control unit and the second control unit on one side to the first electric parking brake actuation unit and the second electric parking brake actuation unit on the other side. The control line system can consist of a first control line between the first control unit and the first electric parking brake actuation unit and a second control line between the second control unit and the second electric parking brake actuation unit.

Thus in the system according to the first aspect in particular, no other control line can be present that connects the first control unit to the second electric parking brake actuation unit and/or the second control unit to the first electric parking brake actuation unit. In the system according to the second aspect, on the other hand, the first control unit can be connected in one variant both to the first electric parking brake actuation unit and to the second electric parking brake actuation unit via suitable control lines. Alternatively or in addition to this, in the system according to the second aspect the second control unit can be connected both to the first electric parking brake actuation unit and to the second electric parking brake actuation unit via suitable control lines.

In the motor vehicle system according to the first aspect or the second aspect, a control system can further be provided, which is provided for control of the first electric parking brake actuation unit and the second electric parking brake actuation unit. The control system can consist of the first control unit and the second control unit. Thus in particular no other control unit can be provided in the vehicle that permits control of the first electric parking brake actuation unit and/or of the second electric parking brake actuation unit.

In the system according to the first aspect, one of the first and second control units can be configured to control an anti-blocking and/or electronic stability control system. According to this aspect one of the first and second control units can likewise be configured to control an automatic transmission. In this aspect one of the first and second control units, or a third control unit, can further be configured to control an electric brake power generator. In another variant of the first aspect, a third control unit with at least a third microprocessor can be provided, wherein the third control unit is configured to control an electric brake power generator, wherein one of the first and second control units is configured to control an anti-blocking and/or electronic stability control system, and the other of the first and second control units is configured to control an automatic transmission.

In a similar manner, a third control unit with at least a third microprocessor can be provided in the motor vehicle system according to the second aspect. This third control unit can be configured to control the electric brake power generator, wherein the second control unit is configured to control the automatic transmission.

In both of the aspects described here, the electric brake power generator can comprise a third electric actuation unit, which is formed to act on a main cylinder of an electrohydraulic brake system to generate at least a portion of the braking power. The electric brake power generator can be used as a brake booster to boost electrically a braking power portion introduced by the driver mechanically into the main cylinder. Alternatively to this, the third electric actuation unit can be formed to generate the entire braking power by acting on the main cylinder (for example as part of autonomous driving or in brake-by-wire operation).

In all of the aspects presented here, an input device can be present, which is formed to generate a parking brake command. The input device can be a button, switch etc. operable by a driver, for example. The input device can be coupled electrically at least to the first control unit to signal the parking brake command to the first control unit. Alternatively or in addition to this, the input device can be coupled electrically to the second control unit or the third control unit to signal the parking brake command to the relevant control unit. The first control unit can be formed in turn to control the first electric parking brake actuation unit as a function of the parking brake command. In the same way, the second or third control unit can be formed in addition or alternatively to this to control the second electric parking brake actuation unit as a function of the parking brake command.

The parking brake command can generally be aimed at activation (thus closing) or release of the parking brake. Control of the respective control unit can accordingly be aimed at activation or release of the corresponding parking brake actuation unit.

In all of the aspects presented here, a communications connection can further be provided between the first control unit and the second control unit (and optionally provided further control units). The first control unit and the second control unit (and optionally provided further control units) can be configured to communicate with one another via the communications connection. The communications connection can be configured to be redundant. For example, two bus or line systems formed parallel to one another can be provided.

The first control unit can be configured to communicate the parking brake command via the communications connection to the second control unit. The first control unit can in particular cause the second control unit to control the second electric parking brake actuation unit on the basis of the parking brake command by means of this communication.

According to the first or the second aspect of the motor vehicle system described here, the second control unit can be configured to control an automatic transmission that is formed without a mechanical gear lock. In this case the second control unit can control the second electric parking brake actuation unit in a gear lock mode. According to the second aspect of the vehicle system described here, the second control unit can also be formed to control the first electric parking brake actuation unit in gear lock mode. The gear lock mode can be activated in particular in that an input device associated with the transmission can be brought into a parking position by the driver. The gear lock mode also comprises the situation that the corresponding input device of the automatic transmission is brought from the parking position into a driving position. Different gear lock commands can thus be generated with the input device depending on whether the parking position is assumed or exited. While the parking brake actuation units are activated in the first case, release of the parking brake actuation units is initiated in the last-named case.

According to the second aspect of the motor vehicle system presented here in particular, the second control unit can be configured to communicate in gear lock mode via the communications connection with the first control unit to cause this to control the first electric parking brake actuation unit on the basis of the gear lock command.

In all of the aspects presented here, the system can further comprise a first electric supply system (for example, in the form of a battery or an accumulator) for the first control unit and/or the first electric parking brake actuation unit. In the same way, a second electric supply system can be present for the second control unit (or the third control unit) and/or the second electric parking brake actuation unit.

The first vehicle wheel can generally be a right front wheel. In addition or alternatively to this, the second vehicle wheel can be a left front wheel. In other variants the first vehicle wheel can be a right rear wheel, while the second vehicle wheel is a left rear wheel. A diagonal distribution can also take place, according to which the first vehicle wheel is arranged on a front axle and the second vehicle wheel is diagonally opposite on a rear axle.

Furthermore, at least one electric generator can be provided. The function of the at least one generator can be provided by an electric drive of the motor vehicle (which then operates in generator mode) or by an electric machine operated exclusively in generator mode.

An electric generator can be provided per vehicle axle or per vehicle wheel. In one variant, the at least one electric generator can be coupled to the right rear wheel and/or the left rear wheel of the vehicle. In an alternative or cumulative configuration, the at least one electric generator can be coupled to the right front wheel and/or the left front wheel of the vehicle. Such a coupling can be undertaken in particular selectively if a braking effect is to be produced by means of the generator mode at the corresponding rear wheel (e.g. in the context of autonomous driving, including autonomous parking).

In general the first control unit and the second control unit as well as the optionally provided third control unit can be provided spatially separated from one another. This spatial separation can be accomplished by separate housings for the control units, for example. The individual control units can also be installed at different locations in the vehicle.

According to a third aspect, a method is specified for controlling a motor vehicle system, which comprises a first electric parking brake actuation unit, which is associated with a first vehicle wheel, a second electric parking brake actuation unit, which is associated with a second vehicle wheel, a first control unit with at least a first microprocessor, wherein the first control unit is configured for controlling the first electric parking brake actuation unit and does not permit control of the second electric parking brake actuation unit, and a second control unit with at least a second microprocessor, wherein the second control unit is configured for controlling the second electric parking brake actuation unit and does not permit control of the first electric parking brake actuation unit. The method comprises the steps of control of the first electric parking brake actuation unit by means of the first control unit, without controlling the second electric parking brake actuation unit by means of the first control unit, and control of the second electric parking brake actuation unit by means of the second control unit, without controlling the first electric parking brake actuation unit by means of the second control unit.

According to a fourth aspect, a method is specified for controlling a motor vehicle system, which system comprises a first electric parking brake actuation unit, which is associated with a first vehicle wheel, a second electric parking brake actuation unit, which is associated with a second vehicle wheel, a first control unit with at least a first microprocessor, wherein the first control unit is configured for controlling at least the first parking brake actuation unit as well as an anti-blocking and/or electronic stability control system, and a second control unit with at least a second microprocessor, wherein the second control unit is configured for controlling at least the second parking brake actuation unit as well as an electric brake power generator and/or an automatic transmission. The method comprises the steps of controlling the first electric parking brake actuation unit by means of the first control unit and of controlling the second electric parking brake actuation unit by means of the second control unit.

The control steps of the method according to the third aspect or according to the fourth aspect can be carried out substantially simultaneously. Furthermore, the respective method can comprise the detection of a control command, wherein the control command is a parking brake command by the driver, a gear lock command by the driver or an emergency braking command.

According to another aspect, a computer program with program code is specified for implementing the method according to the third or the fourth aspect when the corresponding method is carried out by the first control unit and the second control unit. A control apparatus system is also specified, which comprises the computer program as well as the first control unit and the second control unit, which are configured to execute the computer program.

Other advantages of this invention will become apparent to those skilled in the art from the following detailed description of the preferred embodiments, when read in light of the accompanying drawings.

DETAILED DESCRIPTION OF THE INVENTION

Exemplary embodiments of the present disclosure are explained below by means of the drawings, wherein in FIG. 1 and in FIG. 2 an electronically controlled vehicle system is depicted schematically in each case.

Figure 1:
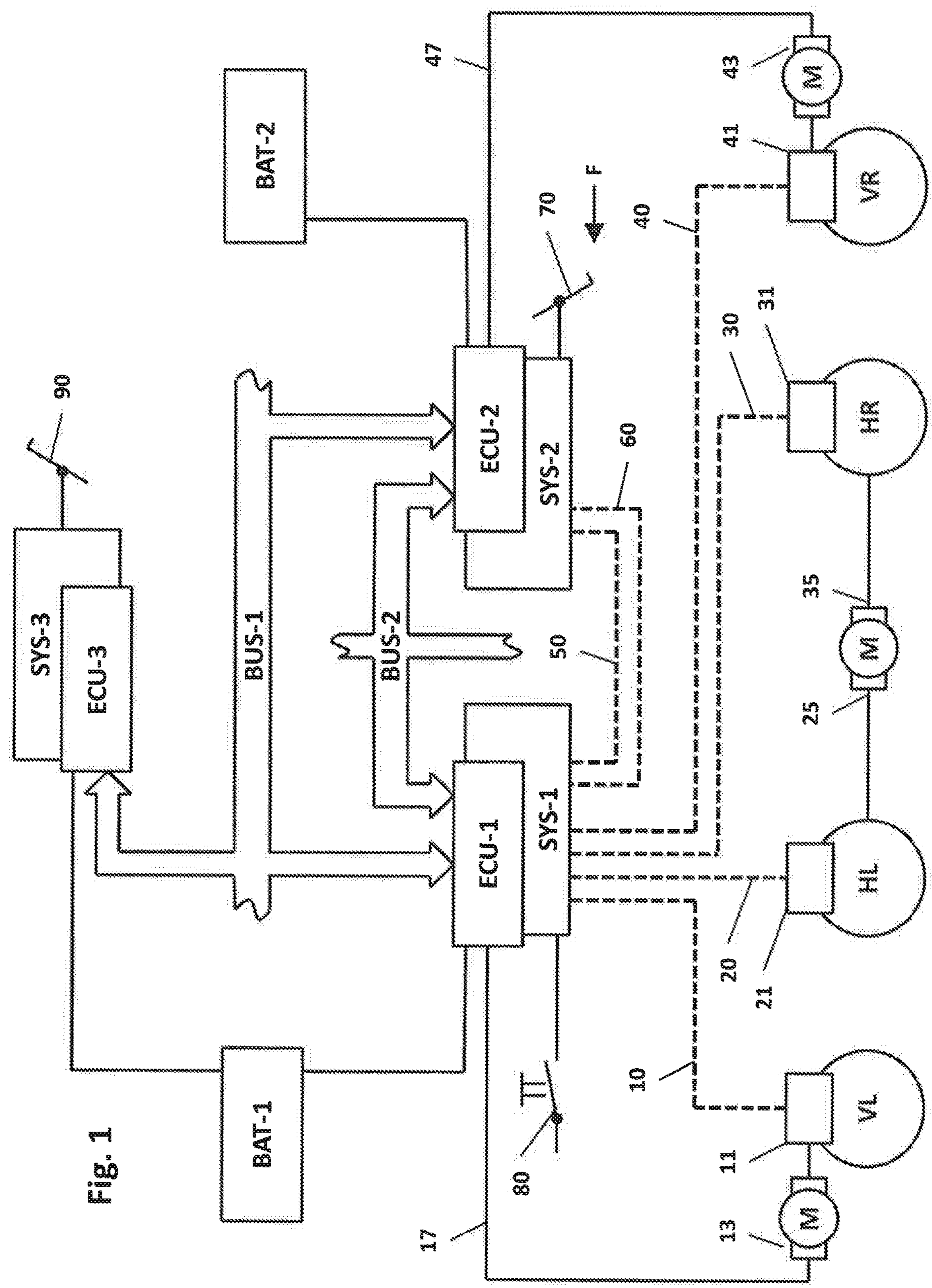
FIG. 1 is a first exemplary embodiment of a redundantly configured vehicle system.
Figure 2:
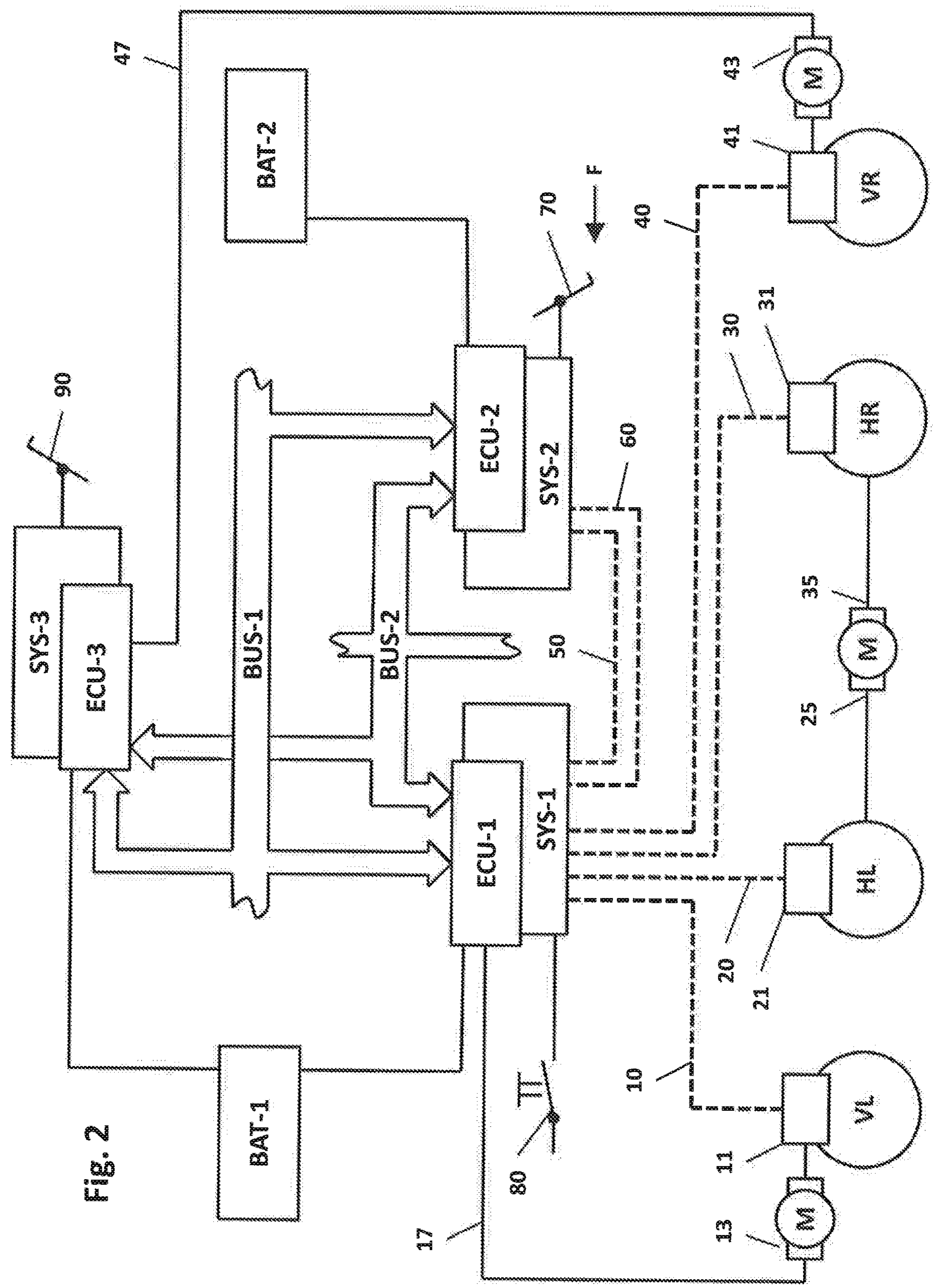
FIG. 2 is a second exemplary embodiment of a redundantly configured vehicle system.
Figure 3:
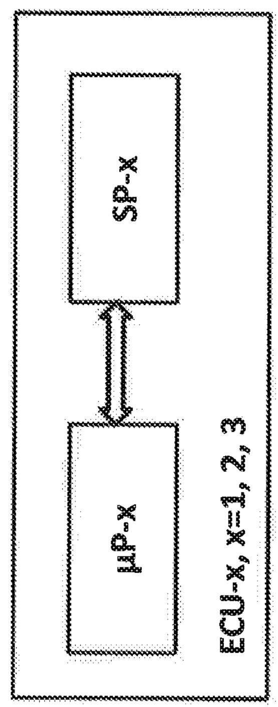
FIG. 3 is an exemplary embodiment of a control unit, in particular for a vehicle system.

The respective system according to FIG. 1 and FIG. 2 comprises a first subsystem SYS-1 and a second subsystem SYS-2. The first subsystem SYS-1 comprises a first electronic control unit (ECU) ECU-1 and the second subsystem SYS-2 comprises a second electronic control unit ECU-2. Each of the two control units ECU-1 and ECU-2 comprises at least one microprocessor μP and at least one storage device SP, as depicted in FIG. 3. The respective storage device SP, for example a semiconductor memory, contains program code for execution by the respective microprocessor μP.

For supplying electrical energy to the two subsystems SYS-1 and SYS-2 including the two electronic control units ECU-1 and ECU-2, a first accumulator BAT-1 and a second accumulator BAT-2 are used respectively. The first electronic control unit ECU-1 and if applicable other components of the first subsystem SYS-1 are operated (at least) at the first accumulator BAT-1; the second electronic control unit ECU-2 and if applicable other components of the second subsystem SYS-2 are operated (at least) at the second accumulator BAT-2. The entire system has a high operational safety due to this, as in the event of a defective first accumulator BAT-1 (at least) the second electronic control unit ECU-2 (and if applicable the entire second subsystem SYS-2) can continue to be operated. Likewise, in the event of a defective second accumulator BAT-2 (at least) the first electronic control unit ECU-1 (and if applicable the entire first subsystem SYS-1) can continue to be operated.

For communication (e.g. for data transmissions, transmissions of control commands etc.) between the two subsystems SYS-1 and SYS-2 and in particular between the two electronic control units ECU-1 and ECU-2, a first bus system BUS-1 and a second bus system. BUS-2 are provided. For high operational safety of the entire system, the two bus systems BUS-1 and BUS-2 are arranged parallel in a redundant manner in regard to the two subsystems SYS-1 and SYS-2 (especially in regard to the two electronic control units ECU-1 and ECU-2). In the event of a defective bus system BUS-1 or BUS-2, communication can thus continue to be maintained by means of the other bus system BUS-2 or BUS-1. Since vehicles are now equipped with bus systems anyway, e.g. a CAN bus (Controller Area Network), these can also be used for at least one of the two bus systems BUS-1 and BUS-2, in order to save additional expense.

Hydraulically actuatable wheel brakes 11, 21, 31 and 41 of the vehicle are connected to the first subsystem SYS-1, more precisely to a hydraulic control unit (HCU) of the same, via hydraulic lines 10, 20, 30 and 40. In the exemplary embodiments the first subsystem SYS-1 is an electrohydraulic system, which facilitates driver-independent, individual generation and control of the brake pressures in the wheel brakes 11, 21, 31 and 41. The first subsystem SYS-1 can therefore be or comprise a control system, for example an anti-block and/or electronic stability control system (ABS or ESC) that is now standard in vehicles.

The second subsystem SYS-2 is connected via hydraulic lines 50, 60 to the first subsystem SYS-1. The second subsystem SYS-2 is configured in the exemplary embodiments to generate brake pressures for the first subsystem SYS-1 and/or the wheel brakes 11, 21, 31 and 41. To understand the possibilities resulting from the present and subsequent "and/or" links between the terms "the first subsystem SYS-1" and "the wheel brakes 11, 21, 31 and 41", the following variants are explained by way of example:

The second subsystem SYS-2 generates the brake pressures via the hydraulic lines 50, 60 directly for the wheel brakes 11, 21, 31 and 41 when the first subsystem SYS-1 is passive, thus no (e.g. overlaying) wheel-individual control interventions, such as ABS or ESC control, is executed.

If the first subsystem SYS-1 is active, however, in order e.g. to execute ABS or ESC control, then in some variants the second subsystem SYS-2 can provide the first subsystem SYS-1 on the input side with brake pressures via the hydraulic lines 50, 60, so that the first subsystem SYS-1 can control brake pressures for the wheel brakes 11, 21, 31 and 41 wheel-individually on the output side (e.g. by maintaining, increasing or reducing the brake pressure). Such control can even take place when the second subsystem SYS-2 does not provide any brake pressures. For this purpose the first subsystem SYS-1 comprises a separate brake pressure generator (e.g. an electrically operated hydraulic pump).

Since individual control interventions are not always necessary at all wheel brakes simultaneously, e.g. if only one front wheel on the outside of a bend is to be braked in the context of ESC control, to prevent understeering of the vehicle, combinations of the two aforesaid possibilities are normal in practical operation.

The second subsystem SYS-2 is generally a brake power generator configured as a brake pressure generator system, such as an assembly with an electric brake booster (EBB), for instance, which acts on a main cylinder in a hydraulic system design. As a brake power generator the second subsystem SYS-2 is configured to fulfil one or more of the following functions:

to detect a braking intention requested by a driver via a brake pedal 70, which intention is aimed at deceleration of the motor vehicle;

to boost an actuation force F initiated by the driver via the brake pedal 70 by means of an electric actuation unit according to the electric, electrohydraulic or electropneumatic principle;

to generate the brake pressures for the first subsystem SYS-1 and/or the wheel brakes 11, 21, 31 and 41 by means of an electric actuation unit according to the electric, electrohydraulic or electropneumatic principle.

The second subsystem SYS-2 can thus be operated, among other things, in one or more of the following operating modes:

For the function of a hydraulic service brake, thus in normal braking operations, the actuation force F applied by the driver via the brake pedal 70 is boosted in particular by means of an electric actuation unit, wherein the brake pressures for the first subsystem SYS-1 and/or the wheel brakes 11, 21, 31 and 41 are generated in a main cylinder as a function of the boosted actuation force, preferably according to a previously determined booster characteristic.

If the brake system and in particular the second subsystem SYS-2 is configured as a BBW system brake by wire), for the function of the service brake and thus for normal braking operations the deceleration intention initiated by the driver via the brake pedal 70 is detected, in order to generate brake pressures for the first subsystem SYS-1 and/or the wheel brakes 11, 21, 31 and 41 as a function of this. In this case the deceleration intention is determined by means of a suitable sensor system, which detects the force and/or path characteristic initiated at the brake pedal 70. The deceleration intention is then converted by the electronic control unit ECU-2 into a control signal for an electric actuation unit, which acts on a main cylinder. The brake pedal 70 remains decoupled from the main cylinder, however. A simulator can convey a conventional pedal feel to the driver in spite of the decoupling.

In the case of emergency braking, for example braking which must be guaranteed in spite of a defective accumulator BAT-2, the brake pressures for the first subsystem SYS-1 and/or the wheel brakes 11, 21, 31 and 41 are generated either according to a reduced booster characteristic compared with normal braking operations or directly as a function of the actuation force F initiated by the driver via the brake pedal 70 into the main cylinder. In a BBW system this happens e.g. according to the push-through principle, in which the decoupling of brake pedal 70 and main cylinder is cancelled.

In the case of automatic braking, thus braking that takes place independently of any actuation initiated by the driver via the brake pedal 70, the brake pressures for the first subsystem SYS-1 and/or the wheel brakes 11, 21, 31 and 41 are generated as a function of the parameters required for automatic braking, e.g. vehicle deceleration and vehicle speed. Automatic braking operations take place e.g. in the context of adaptive control of the vehicle speed known as an ACC function (Adaptive Cruise Control) or electronic stability control known as an ESC function and in autonomous driving in AD mode (Autonomous Driving) or RCP mode (Remote Controlled Parking) of the vehicle.

In the case of regenerative braking, thus braking in which the kinetic energy of an electric or hybrid vehicle released on braking is converted into electrical energy and is fed back into an accumulator (e.g. BAT-1 or BAT-2) or similar, the deceleration intention initiated by the driver via the brake pedal 70 is determined first if automatic braking is not involved. As a function of this, an electric drive 25, 35 of the vehicle, which acts here on the two rear wheels HL and HR, is operated as a generator. If by contrast automatic braking is involved, the generator operation of the electric drive 25, 35 takes place as a function of the deceleration required for automatic braking. If the regenerative braking torque is not sufficient, thus the deceleration intention (no automatic braking) or the required deceleration (automatic braking) is greater than the maximally attainable deceleration in generator mode, a hydraulic braking torque is additionally applied for compensation, in that corresponding brake pressures are generated and adjusted for the first subsystem SYS-1 and/or the wheel brakes 11, 21, 31 and 41. It should be noted that the electric drive of the vehicle can naturally also act on the two front wheels VL, VR instead of the two rear wheels HL, HR or on all four wheels VL, VR, HL, HR.

If the first subsystem SYS-1 is adapted to generate brake pressures itself according to an electrohydraulic principle, which is regularly the case with an ESC system, for example, the first subsystem SYS-1 can generate and adjust brake pressures in one or more of the wheel brakes 11, 21, 31 and 41 independently of the second subsystem SYS-2. It is consequently possible in certain implementation variants that automatic braking operations, in particular the ACC and ESC function, are carried out independently by the first subsystem SYS-1. Another aspect in this context is that in this case hydraulic actuation of the wheel brakes 11, 21, 31 and 41 is guaranteed even in spite of a defective second subsystem. SYS-2 or in spite of defective hydraulic lines 50, 60, due to which the operational safety of the brake system is increased.

Furthermore, for the function of a parking brake (also known as an emergency brake) the brake system shown in FIG. 1 and FIG. 2 is equipped with an EPB system to be able to hold the vehicle securely at a stop in EPB mode. The EPB system comprises a first electric, preferably electromechanical actuation unit 13 and a second electric, preferably electromechanical actuation unit 43. The first actuation unit 13 acts on the wheel brake 11 associated with the front wheel VL and the second actuation unit 43 acts on the wheel brake 41 associated with the front wheel VR. The EPB system itself does not comprise any electronic control unit of its own in the exemplary embodiments (thus no microprocessor μP and no storage device SP of its own), as according to FIG. 1 the first actuation unit 13 can be controlled by the electronic control unit ECU-1 of the first subsystem SYS-1 via a control line 17 and the second actuation unit 43 can be controlled by the electronic control unit ECU-2 of the second subsystem SYS-2 via a control line 47. The corresponding program code for operation of the EPB system is accordingly filed in the storage devices SP-1 and SP-2 of the first and second subsystem SYS-1 and SYS-2 and is executed by the corresponding microprocessor μP-1 and μP-2 (cf. FIG. 3).

As input device the EPB system comprises an actuating element 80 (e.g. a switch or button), via which the driver enters his control command. The control command typically "close emergency brake" or "open emergency brake"—is detected and evaluated here by the first electronic control unit ECU-1. According to the result of the evaluation, the first actuation unit 13 of the wheel brake 11 associated with the front wheel. VL is actuated. Since the actuation of the second actuation unit 43 of the wheel brake 41 associated with the front wheel VR is carried out according to FIG. 1 by the second electronic control unit ECU-2, the control command is transmitted via the first bus system BUS-1 and/or the second bus system BUS-2 from the first electronic control unit ECU-1 to the second electronic control unit ECU-2. Redundancy exists on account of the bus systems BUS-1 and BUS-2 arranged in parallel, so that fault-tolerant communication between the electronic control units ECU-1 and ECU-2 is guaranteed.

It is also possible to actuate the EPB system (thus in particular the parking brake actuation units 13, 43) independently of an actuation of the operating element 80, thus independently of the control intention of the driver. This takes place e.g. in the context of a hill start assist known as an function (hill holder), which prevents the vehicle from rolling away on an inclined road by automatic closing of the parking brake and facilitates a comfortable start-up of the vehicle on the inclined road by automatic opening of the parking brake (for example as a function of the angle of inclination and/or the torque provided by the drive motor of the vehicle). Braking or emergency braking operations can also be carried out autonomously by the EPB system, in particular as a fallback solution in AD or RCP mode, for example.

The subsystems SYS-1 and SYS-2 can communicate via the two bus systems BUS-1 and BUS-2 with other vehicle systems, for example a third subsystem SYS-3 depicted in FIG. 1 and FIG. 2. The third subsystem SYS-3 comprises a third electronic control unit ECU-3 (with associated microprocessor μP-3 and associated storage device SP-3; cf. FIG. 3). It is operated here (at least) at the first accumulator BAT-1. For communication with the two subsystems SYS-1 and SYS-2 (and in particular the two electronic control units ECU-1 and ECU-2) the third subsystem SYS-3 (and in particular the third electronic control system ECU-3) is connected according to FIG. 1 to the first bus system BUS-1 by way of example.

In one implementation variant the third subsystem SYS-3 is an electronically controlled automatic transmission, which is operated by the driver via an input device formed as an actuation element 90 (for example a selector lever or a mode dial). In the parking or P position of the actuation element 90 additional securing of the vehicle must be brought about, to which end a mechanical lock is conventionally provided in the transmission. The outlay on such a mechanical gear lock can be saved by the EPB system (thus in particular the parking brake actuation units 13, 43) assuming this function. Thus automatic closing of the parking brake takes place when the P position is selected at the actuation element 90, and automatic opening of the parking brake takes place when the P position is exited at the actuation element 90.

To this end the position of the actuation element 90 is detected and evaluated by the third electronic control unit ECU-3 and transferred via the first bus system BUS-1 in parallel to the first electronic control unit ECU-1 and the second electronic control unit ECU-2, so that according to FIG. 1 the first actuation unit 13 of the wheel brake 11 associated with the front wheel VL and the second actuation unit 43 of the wheel brake 41 associated with the front wheel VR can be actuated accordingly by these. On account of the redundancies described above, at least one of the two actuation units 13 and/or 43 of the EPB system can thus always be actuated to securely guarantee the function of the gear lock.

Since at least one of the two actuation units 13 and/or 43 of the EPB system can always be actuated on account of the existing redundancy, the EPB system can also assume other safety functions apart from the function of the gear lock. This is the case e.g. in highly automated driving, in particular in RCP mode of the vehicle, when the vehicle can drive, steer and park without the possibility of driver influence. In these applications the EPB system offers another fallback solution in the event of failure of the first subsystem SYS-1 or the second subsystem. SYS-2, in order to be able to carry out emergency braking operations, for example, or to hold the vehicle at a stop.

In connection with highly automated driving, in particular in RCP mode (during which the driver is possibly even located outside the vehicle), the availability of the second subsystem SYS-2 is limited anyway, as on account of the lack of any possibility of driver influence no actuation of the brake pedal 70 is possible for emergency braking operations. This is equivalent to a partial (mechanical) failure of the second subsystem SYS-2. However, it is then to be assumed that the associated electronic control unit ECU-2 is functional, in order to be able to control at least the second actuation unit 43 of the EPB system via the control line 47 if a (complete) failure of the first subsystem SYS-1 should occur.

For even higher safety it can be provided according to FIG. 2 that the third subsystem SYS-3 (and in particular the third electronic control unit ECU-3) is not only connected to one of the bus systems BUS-1 or BUS-2, but in parallel to both bus systems BUS-1 and BUS-2 to guarantee redundant communication with the electronic control units ECU-1 and ECU-2. In particular in this context it can further be provided that one of the actuation units 13 or 43 of the EPB system is controlled directly by the electronic control unit ECU-3 of the third subsystem SYS-3. Thus it is provided according to FIG. 2 that the second actuation unit 43 of the EPB system is controlled by the electronic control unit ECU-3 of the third subsystem SYS-3 via the control line 47. A substantial advantage of the motor vehicle system according to FIG. 2 consists in the fact that the EPB system offers another fallback solution in the form of the third subsystem SYS-3 in the event of (e.g. simultaneous) failures of the first subsystem SYS-1 and of the second subsystem SYS-2, in order to carry out emergency braking operations, for example, or to be able to hold the vehicle at a stop.

It is advantageous here in the systems according to FIG. 1 and FIG. 2 if like here the two actuation units 13 and 43 of the EPB system act on the front wheels VL and VR of the vehicle, as due to the dynamic axle load distribution these can transfer a considerably greater share of the brake power than the rear wheels of the vehicle. However, the two actuation units 13 and 43 could naturally also act on the rear wheels HL and HR of the vehicle.

It should be noted with regard to the electronic control units ECU-1 to ECU-3 that these as shown in FIG. 3 each comprise at least one microprocessor μP and at least one storage device SP. The respective storage device SP contains program code for execution by the respective microprocessor μP in connection with the desired function in each case (e.g. EPB, gear lock, BBW service braking, EBB, RCP etc.). In this case a single control unit ECU-1 to ECU-3 can by all means combine even two or more of these functions, in order to reduce the number of control units required in the vehicle and the costs associated with this.

Each of the electronic control units ECU-1 to ECU-3 can form an independent assembly. Thus each of the electronic control units ECU-1 to ECU-3 can have its own housing with its own connections. The electronic control units ECU-1 to ECU-3 can also be installed at different locations in the vehicle.

Figure 4:
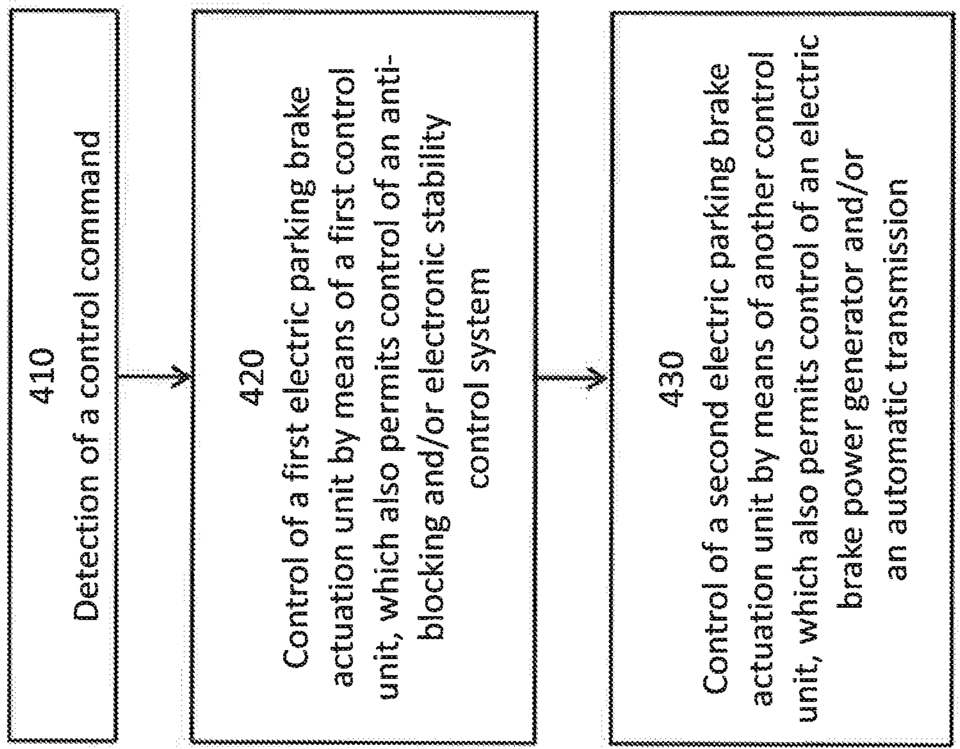
FIGS. 4 & 5 are flow charts of methods according to exemplary embodiments of the present disclosure
Figure 5:
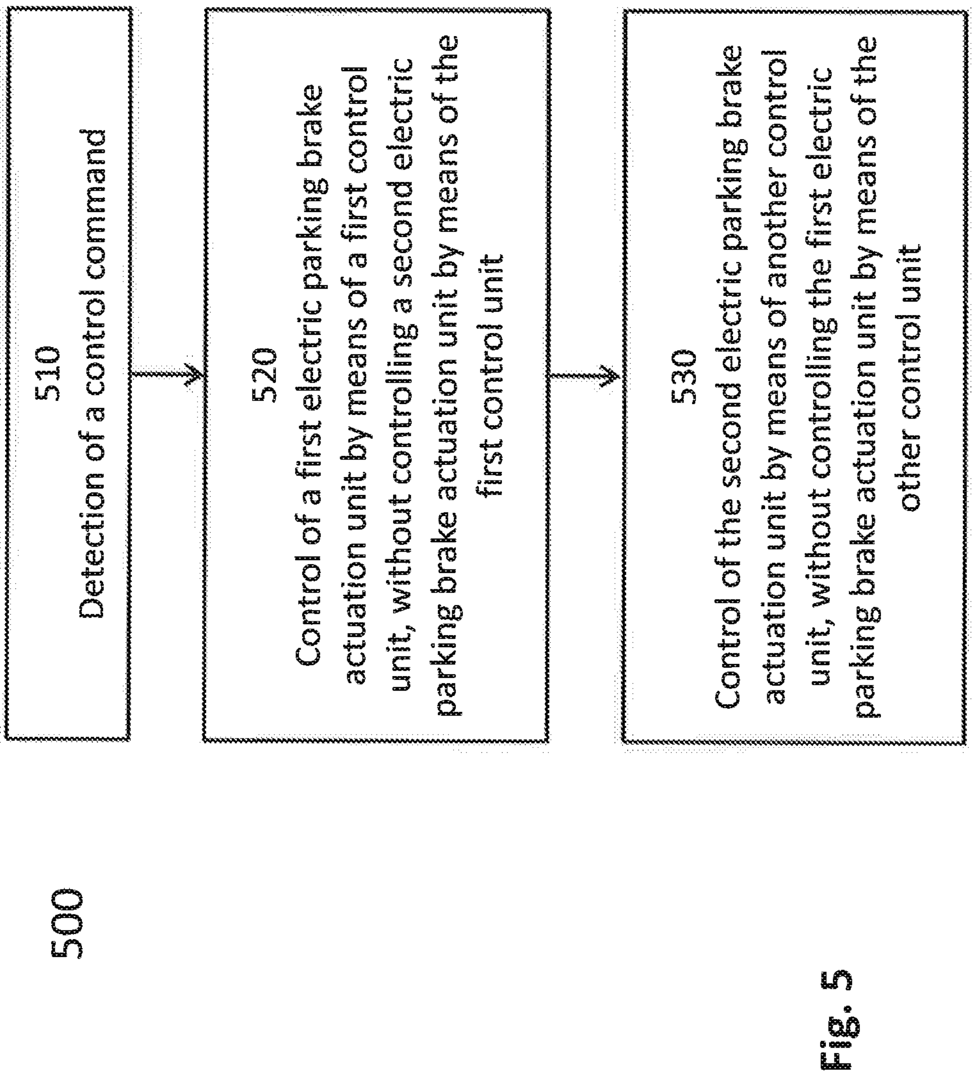

In the flow chart 400, 500, FIGS. 4 and 5 illustrate two exemplary embodiments of methods for controlling a motor vehicle system according to the present disclosure. The respective method can be implemented by the systems depicted in FIGS. 1 and 2 or by a differently configured system.

With reference to FIG. 4, a control command is detected in a first step 410. The control command can be detected by one of the electronic control units ECU-1 to ECU-3 or several of these control units ECU-1 to ECU-3. The control command according to one variant is a parking brake command by the driver (for example, an actuation of the actuation element 80). In another variant it is a gear lock command by the driver (for example, in a gear lock mode based on an actuation of the actuation element 90). In another variant the control command can be an emergency braking command. The emergency braking command can be generated by the system, for example in the event of a failure of a brake system component.

At the detection of the control command, the first parking brake actuation unit 13 and the second parking brake actuation unit 43 are controlled in the steps 420 and 430. The control of the two parking brake actuation units 13, 43 can take place simultaneously or successively. In general a first of the control units ECU-1 to ECU-3 can control the parking brake actuation unit associated with it, for example, and at the same time transmit a control command via the bus system to a second of the control units ECU-1 to ECU-3, so that this controls the parking brake actuation unit associated with it.

Specifically, in step 420 the first electric parking brake actuation unit 13 is controlled by means of the first control unit ECU-1. As described above, the first control unit ECU-1 also permits control of the anti-blocking and/or electronic stability control system of the subsystem SYS-1. In step 430 control of the second electric parking brake actuation unit 43 takes place by means of the second control unit ECU-2 (cf. FIG. 1) or the third control unit ECU-3 (cf. FIG. 2). As already described, this other control unit ECU-2 or ECU-3 also permits control of the electric brake power generator within the subsystem SYS-2 or of the automatic transmission according to the subsystem SYS-3.

By integration of the parking brake control functionality into the control units ECU-1 to ECU-3, which are also provided for other control purposes, a separate parking brake control unit can be eliminated. The system costs can be reduced in this way. Furthermore, due to the controllability of the two parking brake actuation devices 13, 43 by means of different control units ECU-1 to ECU-3, a redundancy is provided to the extent that even in the event of failure of one of the control units ECU-1 to ECU-3, at least one of the parking brake actuation units 13, 43 still remains controllable by the remaining control unit(s) ECU-1 to ECU-3.

With reference to FIG. 5, the method depicted there likewise commences with the detection of a control command in step 510. Step 510 corresponds to step 410 already explained above.

Control of the first electric parking brake actuation unit 13 by means of the first control unit ECU-1 then takes place in step 520 as well as of the second electric parking brake actuation unit 43 by means of another control unit (e.g. ECU-2 in FIG. 1 or ECU-3 in FIG. 2). The two control steps 520, 530 can be carried out in parallel or after one another. Thus the first control unit ECU-1 can cause the second or third control unit ECU-2 or ECU-3 to control the parking brake actuation unit 43, for example.

Since in the exemplary embodiments of FIGS. 1 and 2 only a single control line 17, 47 is present between the control unit ECU-1 and the parking brake actuation unit 13 and between the control unit ECU-2 or ECU-3 and the parking brake actuation unit 43, the control of the parking brake actuation unit 13 in step 520 takes place in such a way that the control unit ECU-1 does not control the parking brake actuation unit 43. In the same manner the other control unit ECU-2 or ECU-3 does not control the other parking brake actuation unit 13 in control of the parking brake actuation unit 43.

Since the control units ECU-1 and ECU-2 or ECU-3 each control only a single one of the two parking brake actuation units 13, 43, the control units can be designed more compactly. In particular, each of these control units ECU-1 to ECU-3 requires control components (e.g. power electronics, H-bridge, etc.) for only a single parking brake actuation unit 13, 43. This saves installation space and further reduces the thermal load of each control unit ECU-1 to ECU-3. At the same time, redundancy is present to the extent that in the event of a failure of one of these control units ECU-1 to ECU-3, the one or more remaining control units ECU-1 to ECU-3 still always permit control at least of one other parking brake actuation unit 13, 43.

It is understood that individual aspects of the exemplary embodiments described above can be implemented even independently of the provision of parking brake actuation units. The same or other aspects can be implemented independently of the provision of electric control units.

In accordance with the provisions of the patent statutes, the principle and mode of operation of this invention have been explained and illustrated in its referred embodiments. However, it must be understood that this invention may be practiced otherwise than as specifically explained and illustrated without departing from its spirit or scope.

The invention claimed is:

1. A system for a motor vehicle, comprising:

a first electric parking brake actuation unit, which is associated with a first vehicle wheel;

a second electric parking brake actuation unit, which is associated with a second vehicle wheel;

a first control unit with at least a first microprocessor, wherein the first control unit is configured to control the first electric parking brake actuation unit and does not permit control of the second electric parking brake actuation unit; and a second control unit with at least a second microprocessor, wherein the second control unit is configured to control the second electric parking brake actuation unit and does not permit control of the first electric parking brake actuation unit; and a third control unit with at least a third microprocessor, which is configured to control an automatic transmission, which is formed without a mechanical gear lock, wherein the third control unit is configured to communicate in a gear lock mode via a communications connection with the first control unit, in order to control the first electric parking brake actuation unit on the basis of a gear lock command.

2. The system according to claim 1, further comprising a control line system, which connects the first control unit and the second control unit on the one side to the first electric parking brake actuation unit and the second electric parking brake unit on the other side, wherein the control line system consists of a first control line between the first control unit and the first electric parking brake actuation unit and a second control line between the second control unit and the second electric parking brake actuation unit.

3. The system according to claim 1, further comprising a control system, which is provided for controlling the first electric parking brake actuation unit and the second electric parking brake actuation unit, wherein the control system consists of the first control unit and the second control unit.

4. The system according to claim 1, wherein one of the first and second control units is configured to control an anti-blocking and/or electronic stability control system.

5. The system according to claim 1, wherein one of the first and second control units (ECU-2) is configured to control an electric brake power generator (SYS-2).

6. The system according to claim 1, wherein the second control unit is configured to control an electric brake power generator, and wherein the first control unit is configured to control an anti-blocking and/or electronic stability control system.

7. The system according to claim 5, wherein the electric brake power generator comprises:

a third electric actuation unit, which is formed to act on a main cylinder to generate at least a portion of the braking force.

8. The system according to claim 1, further comprising an input device, which is formed to generate a parking brake request.

9. The system according to claim 8, wherein the input device is coupled electrically at least to the first control unit, in order to signal the parking brake request to the first control unit; and the first control unit is formed to control the first electric parking brake actuation unit as a function of the parking brake request.

10. The system according to claim 8, further comprising a communications connection between the first control unit and the second control unit, wherein the first control unit and the second control unit are configured to communicate with one another via the communications connection.

11. The system according to claim 10, wherein the communications connection is configured to be redundant.

12. The system according to claim 10, wherein the first control unit is configured to communicate the parking brake request via the communications connection to the second control unit.

13. The system according to claim 1, further comprising a first electric supply system for the first control unit and/or the first electric parking brake actuation unit; and a second electric supply system for the second control unit and/or the second electric parking brake actuation unit.

14. The system according to claim 1, wherein the first vehicle wheel is a right front wheel and/or the second vehicle wheel is a left front wheel.

15. The system according to claim 1, wherein the first vehicle wheel is a right rear wheel and/or the second vehicle wheel is a left rear wheel.

16. The system according to claim 1, further comprising at least one electric generator, which is configured to be coupled to a right rear wheel and/or a left rear wheel of the vehicle.

17. The system according to claim 1, wherein the first control unit and the second control unit are provided spatially separated from one another.

18. A method for controlling a system for a motor vehicle according to claim 1, wherein the method comprises:

control of the first electric parking brake actuation unit by means of the first control unit, without controlling the second electric parking brake actuation unit by means of the first control unit; and control of the second electric parking brake actuation unit by means of the second control unit, without controlling the first electric parking brake actuation unit by means of the second control unit; wherein the third control unit communicates in a gear lock mode via a communications connection with the first control unit and causes this to control the first electric parking brake actuation unit on the basis of a gear lock command.

19. The method according to claim 18, further comprising detection of a control command, wherein the control command is a parking brake request by the a driver, a gear lock request by the driver or an emergency braking request, wherein the control of the first electric parking brake actuation unit and the second parking brake actuation unit takes place at the detection of the control command.

20. A computer program with program code for carrying out the method according to claim 18 when the method is carried out by the first control unit and the second control unit.

21. A control apparatus system comprising:

the computer program according to claim 20; and the first control unit and the second control unit, which are formed to execute the computer program.

* * * * *